(12) United States Patent
Takahashi

(10) Patent No.: US 7,677,191 B2
(45) Date of Patent: Mar. 16, 2010

(54) FRICTIONAL RESISTANCE REDUCTION SHIP AND OPERATION METHOD

(76) Inventor: Yoshiaki Takahashi, 2-31-1-705 Sakurashinmachi, Setagaya-ku, Tokyo (JP) 154-0015

( * ) Notice: Subject to any disclaimer, the term of this patent is extended or adjusted under 35 U.S.C. 154(b) by 0 days.

(21) Appl. No.: 12/418,587

(22) Filed: Apr. 4, 2009

(65) Prior Publication Data
US 2010/0018452 A1      Jan. 28, 2010

(30) Foreign Application Priority Data
Jul. 23, 2008    (JP) ............... 2008-190049

(51) Int. Cl.
  *B63B 1/34*    (2006.01)
  *B63B 1/38*    (2006.01)
(52) U.S. Cl. .................................. 114/67 A
(58) Field of Classification Search ............... 114/67 R, 114/67 A, 288–290
See application file for complete search history.

(56) References Cited

U.S. PATENT DOCUMENTS

| | | | | |
|---|---|---|---|---|
| 1,348,828 | A * | 8/1920 | Fessenden | 181/175 |
| 1,398,246 | A * | 11/1921 | Trask | 114/67 A |
| 3,628,488 | A * | 12/1971 | Gibson | 114/67 A |
| 5,575,232 | A * | 11/1996 | Kato et al. | 114/67 A |
| 6,092,480 | A * | 7/2000 | Takahashi et al. | 114/67 A |
| 6,145,459 | A * | 11/2000 | Takahashi et al. | 114/67 A |
| 6,186,085 | B1 * | 2/2001 | Kato et al. | 114/67 A |
| 6,748,891 | B2 * | 6/2004 | Takahashi | 114/67 A |
| 6,789,491 | B2 * | 9/2004 | Takahashi et al. | 114/67 A |

FOREIGN PATENT DOCUMENTS

| | | |
|---|---|---|
| JP | 10-100982 A1 | 4/1998 |
| JP | 11-321775 A1 | 11/1999 |
| JP | 4070385 B | 1/2008 |
| JP | 2008-120246 A1 | 5/2008 |

* cited by examiner

*Primary Examiner*—Ajay Vasudeva
(74) *Attorney, Agent, or Firm*—Lee Fredric Sharra

(57) ABSTRACT

A ship is provided with microbubble generators attached below the waterline to supply microbubbles, which decrease the ship's frictional resistance during navigation and improve fuel efficiency. The below waterline region (L.W.L.) of the ship is divided into an upper region (R1) proximate the waterline, and a lower region (R2) proximate the ship's bottom. The air supply to the microbubble generators (10) in the upper region (R1) is performed through a pipe (3), one end of which is exposed to the atmosphere. The air supply to the microbubble generators (10) in the lower region (R2) is performed through a branch pipe (6) from a pipe (5) using an assist compressor (4), which is arranged as a closed system instead of being exposed to the atmosphere.

10 Claims, 8 Drawing Sheets

Boundary Layer (a)

(b)

(c)

(d)

FRICTIONAL RESISTANCE REDUCTION SHIP AND OPERATION METHOD

TECHNICAL FIELD

The invention relates to a frictional resistance reduction ship which supplies ultra fine bubbles (microbubbles) to the surface outside the hull, and concerns reducing the frictional resistance between hull and water, and its operation method.

BACKGROUND ART

It is known in the art that a ship's hull friction resistances in water will decrease by supplying air bubbles to the surface of a moving hull a1.

There are two types of means to send air to the bubble generator prepared in the ship hull's bottom (lateral surface); one type is a closed type which depresses the air-liquid interfaces in an air charging line to an air bubbles genesis region by means of a compressor; and a second type is an open type system that depresses the air-liquid interface in an air charging line to an air bubbles generator region by negative pressure.

Prior art document 1 (JP 2008-120246 A) and prior art document 2 (JP 2008-143345 A) describe a closed type system. Prior art 1 describes a structure which attaches a flat board so that it covers an air hole, and Prior art 2 describes the structure which introduces air into the water in a uniform state, attaching a baffle plate which covers gas pressure jets.

Here, the flat board described in Prior Art 1 and the baffle plate described in Prior Art 2 do not generate negative pressure as described in the documents concerned.

The closed type forcedly spouts air and as a result the air bubbles will inevitably become large. In order to effectively reduce frictional resistance, air bubbles must stay on the surface of hull for a long time. For this reason it is required that the bubble diameter should be as small as possible. Prior Art 3 (JP 2002-2582 A) describes that such microbubbles are generated according to the Kelvin-Helmholtz-Instability phenomenon.

Namely, in Prior art 3 in the panels of the ship's bottom (submerged surface) a recess is installed. This recess is connected together with a gas inlet tube to supply air to the recess and has a wedge-shaped negative pressure formation part attached to the upper stream side of the recess, which causes the Kelvin-Helmholtz-Instability phenomenon to make microbubble in the recess. Moreover, in Prior art 4 (JP 4070385), the technology of employing a wing is disclosed as a means which makes microbubbles instead of the wedge-shaped negative pressure formation part of Prior art 3.

[Prior art 1] Laid Open Patent JP2008-120246A
[Prior art 2] Laid Open Patent JP2008-143345A
[Prior art 3] Laid Open Patent JP2002-2582A
[Prior art 4] U.S. Pat. No. 4,070,385

DISCLOSURE OF THE INVENTION

Problem Solved by the Invention

If the particle size of the air bubble is small, even if the bubble is generated on the side of the hull, it takes time until reaching the stern of the ship because the bubble buoyancy is low; also then the air bubbles will stay on the hull side. However, the technology described in Prior Art documents 1 and 2 teaches that air is forcedly blown out and only large size air bubbles can be generated, since the particle sizes of each bubble is large, friction reduction effects is small. Furthermore, if an excessive amount of air is forced out, the air mass is sent to the screw and air biting will be caused or it will be the cause of rolling or pitching.

On the other hand, since negative pressure is used according to the technology described in Prior Art documents 3 and 4, it is possible to generate microbubbles which will be able to stay on the hull's side surface. However, the technology described in Prior Art documents 3 and 4, requires the hull itself to be a particular shape form. Moreover, in the state of a low-speed cruising air bubbles cannot be generated because the air-liquid interface in an air charging line cannot be lowered to the microbubble generators with negative pressure.

Incidentally, although a blower is disclosed in Prior Art document 4, this blower does not depress the air-liquid interface in an air charging line. In a condition where the air-liquid interface has already decreased to the microbubble generator, this blower is for sending in a large amount of air.

Means for Solving the Problem

In order to solve an aforementioned problem, this invention is a frictional resistance reduced ship that attaches two or more microbubble generators, each provided with a wing, to generate negative pressure along a ship's bottom from lateral surface when the ship is moving. Disposed beneath the waterline of the hull, a fine bubble generating member is attached to an upper region near the waterline among fields which serves as a lower part rather than said draft side. The microbubble generator in the upper region has a gas-liquid mixing space portion that mixes sea water and air in a portion opposite which a wing is provided. One end of an air supply piping is connected to this gas-liquid mixing space in the upper region and the other end of the piping is exposed to the atmosphere. Additional fine bubble generator is attached to a lower region near a ship's bottom among fields which serve as a lower part rather than the draft side. The microbubble generator in this lower region has a gas-liquid mixing space that mixes sea water and air into a portion opposite which a wing is provided. The air supply piping, which is connected to gas-liquid mixing space in the lower region, has one end connected to an assistant compressor.

Here, the level of the water line will be changed with condition of cargo or cruising state, (such as turning condition) etc. The water line indicated by claim 1 address the water line where the load of the ship is a normal load and assumes the case of the usual navigation state. Moreover, microbubbles refer to the air bubble of particle diameter of several millimeters preferably 1 mm or less.

Incidentally, if a ship starts to run, the wing will generate negative pressure. The air-liquid interface is lowered with this negative pressure. In order to generate microbubbles, it is sufficient if there is only the pressure of air which depresses the column of water from the interface which is lowered to a microbubble generator. For this reason, a large capacity compressor is not required as an assist compressor. For example, when main engine output is a ship of 10000 kw, a compressor having the capacity of 10~20 kw is enough.

In addition, an assistant compressor may be connected directly to each microbubble generator attached to a lower region (a second region R2). However, by connecting through the branch pipes equipped with pressure regulators; if the microbubble generator located below is made the structure to which high-pressure air is supplied, microbubbles will be generated from each microbubble generator simultaneously.

In addition, an end of the air charging line is connected to the microbubble generator attached to upward region (R1) or middle region (R3). Branch pipes may be connected from assist compressor to this air supply pipe through changeover valves. In this way, microbubbles will also be generated from the microbubble generators attached in upper regions or middle regions at the time of a slow cruising.

The operating method of the frictional resistance reduction ship according to the invention is, adjusting the position of the microbubble generator attached to said upward regions for example, or adjusting angle of the wings, when the speed percentage navigation of a vessel is slower than cruising speeds, air bubbles are generated from the microbubble generator connected to an assist compressor, and it cruises by generating air bubbles from all the microbubble generator components above cruising speeds. In addition, the speed at which a microbubble generator begins to generate microbubbles may be set for slower than normal cruising speeds.

EFFECT OF THE INVENTION

According to the frictional resistance reduction ship concerning to this invention, because the negative pressure generated with navigation is utilized it is easy to use the Kelvin-Helmholtz Instability phenomenon mechanism to generate microbubbles, and, moreover, the assist compressor can be driven with minimum necessary power. Therefore, an energy cost is small and contributes greatly to fuel reduction greatly.

BRIEF DESCRIPTION OF THE DRAWINGS

Referring to the accompanying drawings, an embodiment of executing this invention is explained.

DETAILED DESCRIPTION OF THE PREFERRED EMBODIMENTS

Figure 1:
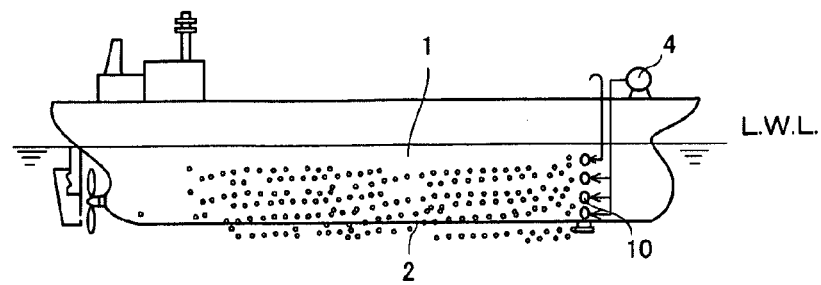
FIG. 1 shows the side view of the resistance reduction ship of the present invention.

The frictional resistance reduction ship of the present invention is equipped with microbubble generators (10), said microbubble generators (10) attached to the lateral surface of ship hull (1), from water line (L.W.L.) to ship bottom (keel) (2). Although the arrangement of the microbubble generators (10) appears linear from the side view, a zigzag or slanting sequence may be used.

In this embodiment, the region which is downward from a waterline (L.W.L.) is divided into upper region (R1) near to a waterline, and lower region (R2) near to a ship's bottom. In upper region (R1) and lower region (R2), the microbubble generators (10) are arranged, and the supply form of air to the microbubble generators (10) for each region (R1)(R2) is different.

That is, supply of the air to the microbubble generators 10 arranged to an upper region (R1) is performed through the air supply pipe 3, one end of the air supply pipe 3 is opened to the atmosphere; and supply of the air to the microbubble generators 10 arranged to a lower regions (R2) is performed through the branch pipe 6 from the pipe 5 from the assist compressor 4. This is to say, supply of the air to the microbubble generators 10 arranged to a lower region (R2) is performed through pipes of closed system instead of being opened to the atmosphere. Furthermore, in order to simplify explanation, although a plurality of microbubble generators 10 may be arranged in the upper region (R1), only one is depicted for the purpose of the example illustration.

Pressure reduction valves V1-V4 are prepared in each said branch pipes 6, and the supply pressure of the air to the microbubble generators 10 directed to lower regions (R2) is made to differ. In this embodiment, the pressure regulator located above is extracted and amount is enlarged. As a result, high-pressure air will be supplied like detailed downward microbubble generators 10. Since the distance from the gas-liquid interfaces in pipe 5 (branch pipe 6) to the microbubble generators 10 increases in downward microbubble generators, pressure regulating valves are prepared and air is supplied evenly from the assist compressor 4.

In addition, it is not necessary to install pressure regulator V4 in the branch pipes to the microbubble generators 10 located most downward. Furthermore, air pressure supplied from the assist compressor 4 may adjusted according to sailing speed.

Figure 4:
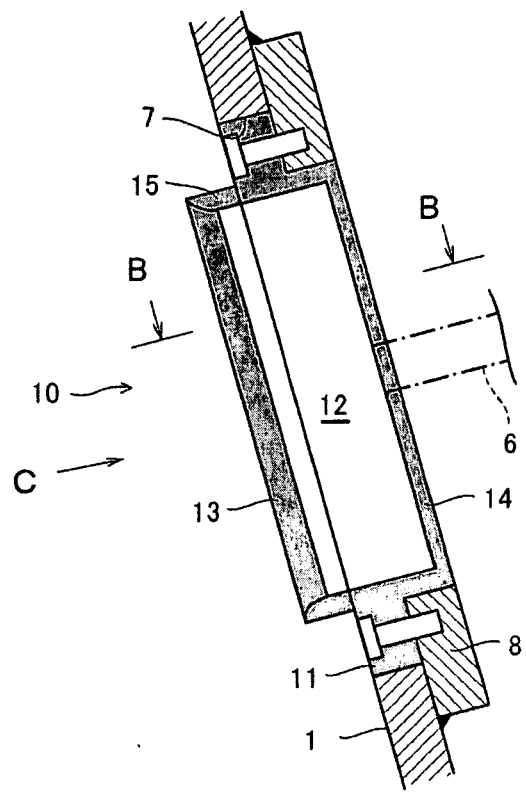
FIG. 4 shows an enlarged view of substantial part of FIG. 3.
Figure 5:
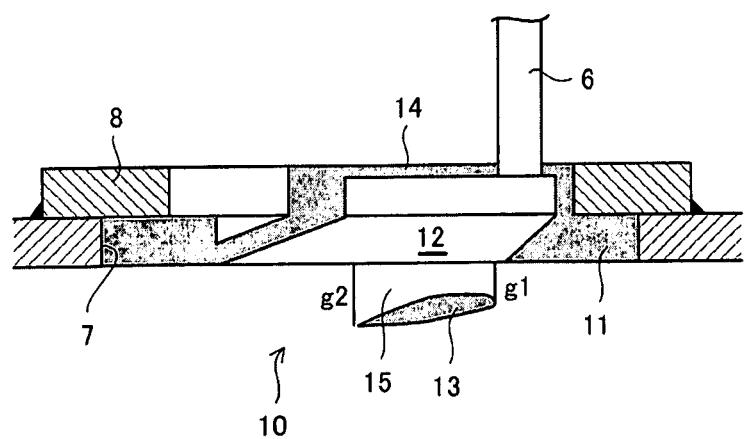
FIG. 5 illustrates the direction sectional view of B-B of FIG. 4.
Figure 6:
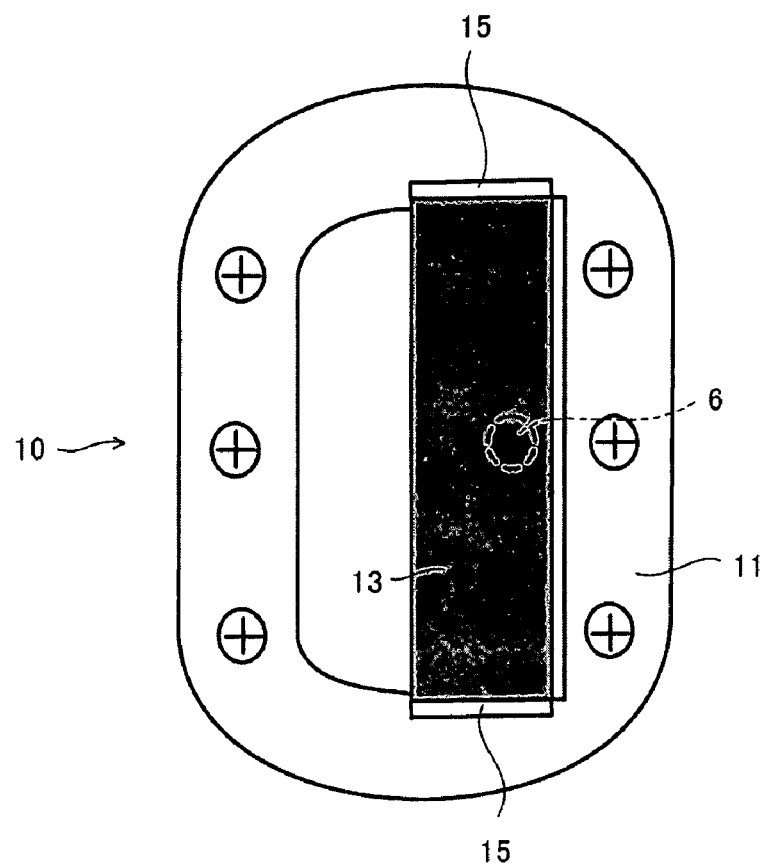
FIG. 6 shows a view of the direction C of FIG. 4.

The structure of microbubble generators 10 is explained based on FIG. 4-6. The microbubble generators 10 consist of a flange portion 11, a gas-liquid mixture space 12, and a wing 13 for negative pressure generation. The microbubble generators 10 can be fabricated in casting or injection molding so that the flange portions 11, the gas-liquid mixture spaces 12, and the wing 13 for negative pressure generating may be united.

On the other hand, an ellipse shaped hole 7 for attaching the microbubble generator 10, carries out an opening to a hull, the retainer plate 8 is welded inside of this hole 7, and the flange portion 11 of the microbubble generators 10 adheres to this retainer plate 8 through the bolt. Here, in order to reduce friction resistances during cruise, it is preferable to make the surface flange portion 11 and the hulls lateral aspects 1, the same.

Moreover, in the embodiment, an air-liquid mixture space 12 is bordered by the wall 14, and the back surface of the wall 14 and the internal surface of the retainer plate 8 into the same aspect. The wall 14 carries out penetration maintenance of the end of said branch pipe 6 (air supply pipe 3), and the air from the branch pipe 6 (air supply pipe 3) is directly supplied in the air-liquid mixture space 12.

Moreover, said wing 13 is attached to the flange portion 11 through the junction 15, it is in the condition, which inserted the flange portion 11 in the hole 7, and the wing 13 projects outer by the length of the junction 15. Moreover, the space g2 formed rearward of the wing 13 is larger than the space g1 formed ahead of the wing 13 in order to generate negative pressure with navigation of vessel. Furthermore, the wing 13 is made to a dolphin shape by side view in order to reduce a frictional resistance.

Hereinfore, immediately after a vessel starts navigation, since the speed of a vessel is slow, the negative pressure generated by a wing 13 is correspondingly low. As a result, the reduction effect of the air-liquid interface in the air supply pipe 3 which supplies air to the microbubble generators 10 arranged to an upper region (R1) is not sufficient. Therefore, there is no generation of the microbubbles from the microbubble generators 10 in upper region (R1).

However, when air of adequate pressure is supplied to the microbubble generators 10 arranged to lower region (R2) from the assist compressor 4 then the gas-liquid interface is depressed in the air supply pipe 5 (branch pipe 6) to the air-liquid mixture space 12 of the microbubble generators 10, and therefore, air is supplied in the air-liquid mixture space 12.

Figure 7:
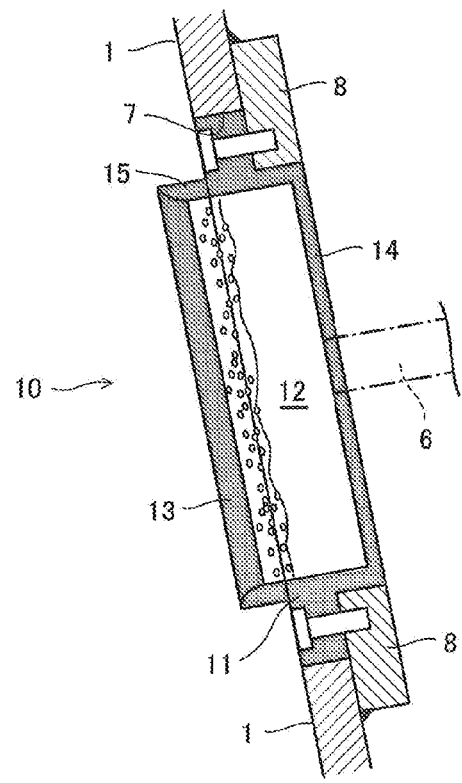
FIG. 7 shows an enlarged view same as FIG. 4 explaining the mechanism of microbubble generation.
Figure 8:
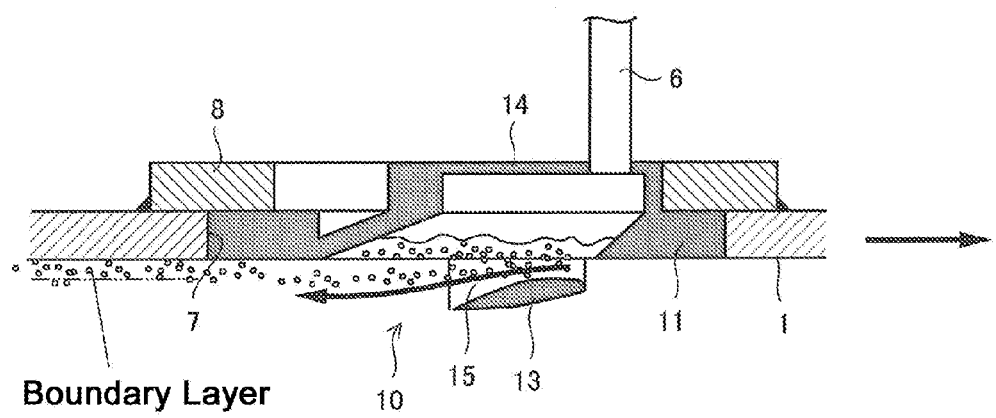
FIG. 8 illustrates the direction sectional view same as FIG. 5 explaining the mechanism of microbubble generation.

And if the negative pressure is generated by the wing 13 becomes large, as shown in FIGS. 7 and 8, the air-liquid interface in the air-liquid mixture space 12 will vary from a plateau to almost perpendicularly state.

In respect of the air-liquid interface in the air-liquid mixture space 12, the air and the water (seawater) move at different speeds. Since density differs between air and water, as shown in FIGS. 7 and 8, microbubbles are generated according to the Kelvin-Helmholtz instability phenomenon mechanism in the air-liquid mixture space 12 of the microbubble generator 10, and these microbubbles flow through them into the downstream side along with a hull.

It is thought that here, the negative pressure generated by a wing 13 causes the microbubbles to stick to the hull flowing onto the downstream side. A boundary layer exists on the hull surface, and the microbubbles move in random motion. When the microbubbles get into the boundary layer, microbubbles will be pushed against the hull by the difference in pressure between the top and bottom (or a lateral surface and an internal surface) of the wing 13. And since resistance will become large if the microbubbles are displaced, since the concentration of an interface product is large (in the case of microbubbles the resistance is proportional to the total contact area of the gas per unit volume near the hull and a liquid when the air bubble moves), the microbubbles flow to a downstream side without coming out of the flow (boundary layer), and a reduction of friction resistance is effectively carried out.

On the other hand, referring to the microbubble generators 10 attached to the bottom 2, it is different than the microbubble generators 10 attached perpendicularly to the surface of the hull 1, so microbubble will be generated while the air-liquid interface has been level in the air-liquid mixture space 12.

Figure 3:
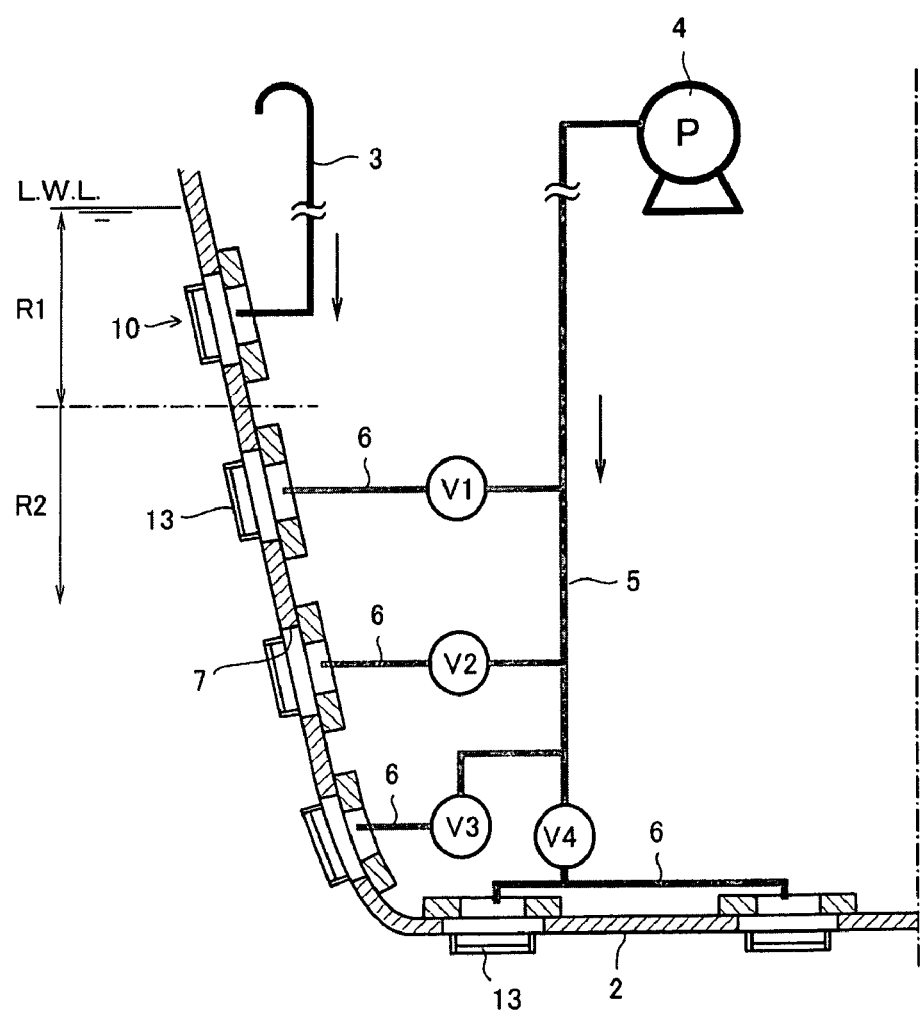
FIG. 3 shows a view of the direction A of FIG. 2.
Figure 9:
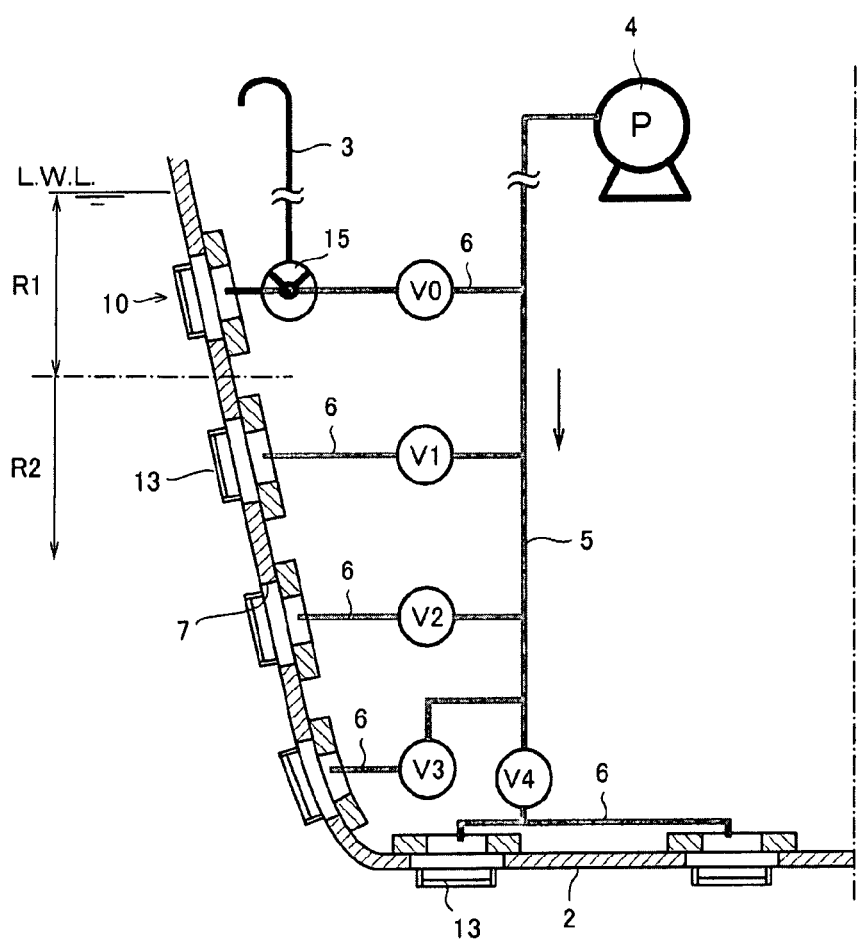
FIG. 9 shows an alternative embodiment of the invention shown in FIG. 3.
Figure 10:
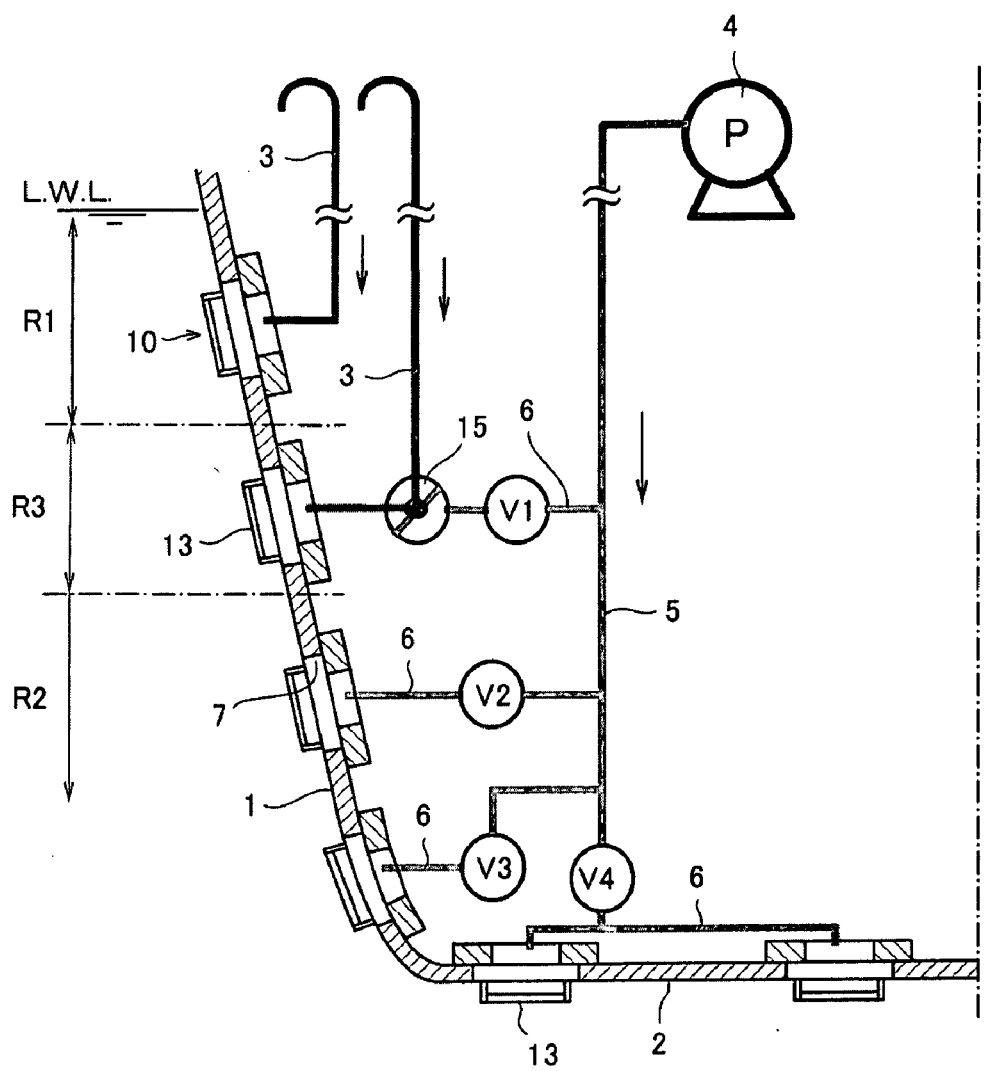
FIG. 10 shows yet another embodiment of the invention shown in FIG. 3.

FIGS. 9 and 10 show a similar embodiment which is shown in FIG. 3. The embodiment shown in FIG. 9, has the branch pipe 6 connecting to the air supply pipe 3 connected with the microbubble generators 10 attached to the upper region R1 near water line, this branch pipe 6 is branched from the air supply pipe 5 connected with the assist compressor 4 through the changeover valves 16. Even though, in the case of very slow speed than cruising speed, the air of the assist compressor 4 will be supplied by operating the changeover valves 16. In this case, the pressure reduction valve V0 prepared in the branch pipes 6 is set wider opened rather than other pressure reduction valves V1-V4.

Another embodiment shown in FIG. 10 forms the middle region R3 between the upper region R1 and the lower region R2. Referring to the microbubble generators 10 attached to this middle region R3, it is possible to choose the air supplying origin, which are connected to the assistant compressor 4 and exposed to atmosphere.

Figure 11:
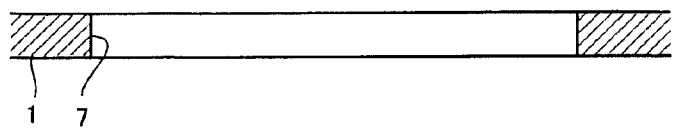
FIG. 11 (a)-(d) depict the attachment of the microbubble generators in still another embodiment.
Figure 11:
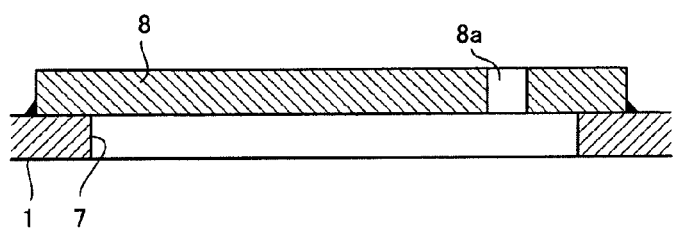
Figure 11:
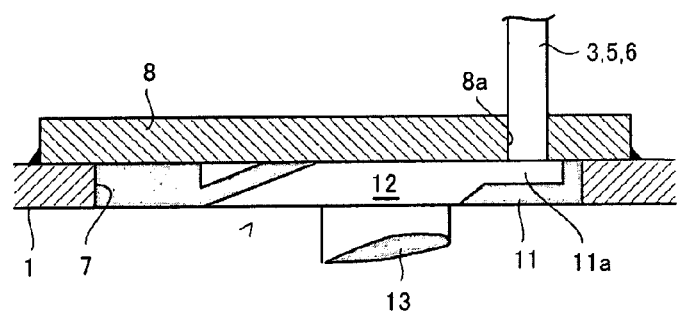
Figure 11:
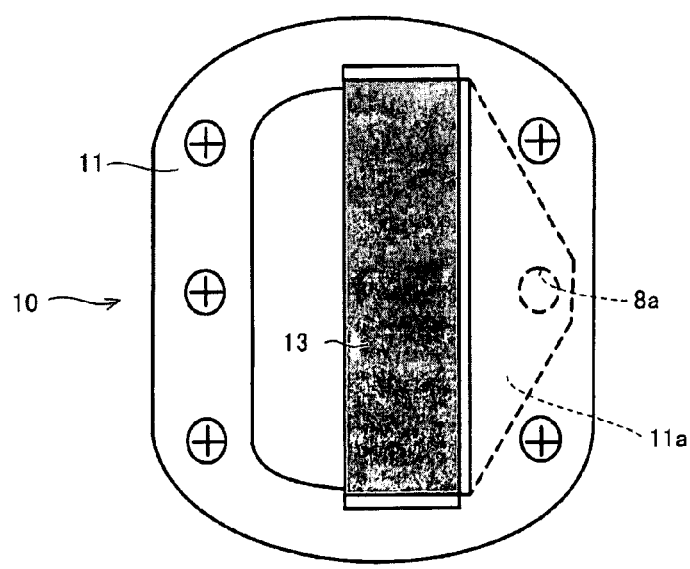

FIG. 11(*a*)~(*d*) describing the attachment procedure of the microbubble generators concerning another embodiment, in this embodiment, said wall 14 is not formed in the microbubble generators 10, but the air-liquid mixture space 12 is bordered with the retainer plate 8.

In a first assembly step, a hole 7 is formed in hull, as shown in (a). Subsequently, as shown in (b), the retainer plate 8 is welded inside hole 7, the through hole 8*a* to which air supply pipe or branch pipes is attached is formed in the retainer plate 8. The through hole 8*a* is formed in the upstream portion of vessel, and as shown in (c) and (d), the flange portion 11 of the microbubble generators 10 is inserted in a hole 7, and it fixes to the retainer plate 8 with a bolt etc.

In the state of the microbubble generator 10 is attached to the hull, a recess 11*a* is formed in the inner side of upstream portion of the flange portion 11, and said through hole 8*a* is overlapped with this recess 11*a* in side view. As a result, air is supplied in the air-liquid mixture space 12 through the recess 11*a* from air supply pipe or branch pipe.

BRIEF EXPLANATION OF THE DRAWINGS

FIG. 1 Shows the side view of the resistance reduction ship of the present invention.

Figure 2:
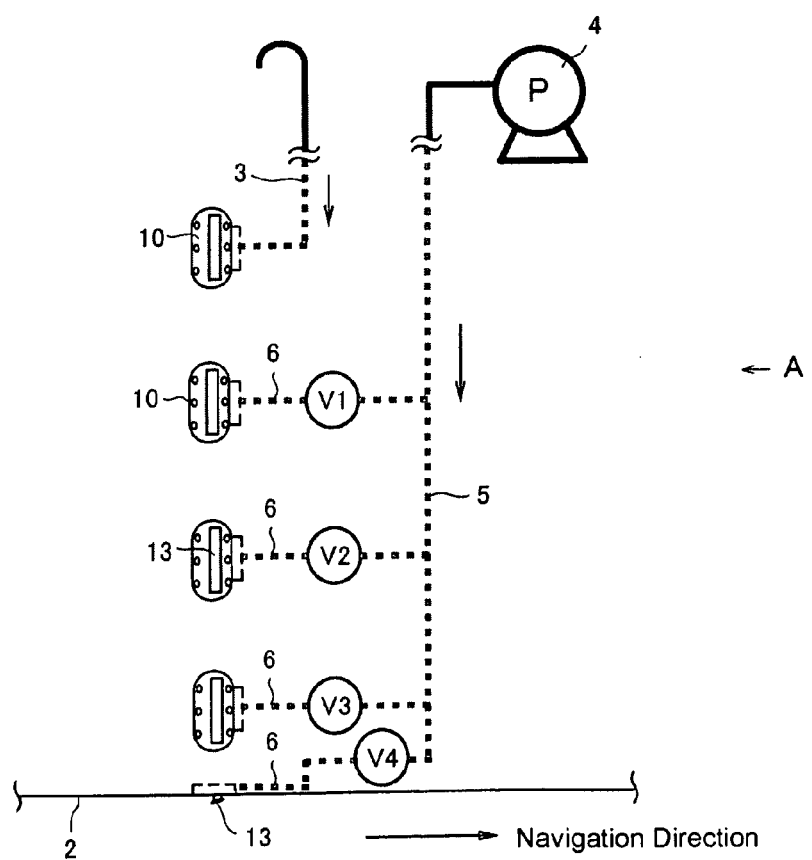
FIG. 2 shows an enlarged view of substantial part of FIG. 1.

FIG. 2 Shows an enlarged view of substantial part of FIG. 1.

FIG. 3 Shows a view of the direction A of FIG. 2.

FIG. 4 Shows an enlarged view of substantial part of FIG. 3.

FIG. 5 Illustrates the direction sectional view of B-B of FIG. 4.

FIG. 6 Shows a view of the direction C of FIG. 4.

FIG. 7 Shows an enlarged view same as FIG. 4 explaining the mechanism of microbubbles generation.

FIG. 8 Illustrated the direction sectional view same as FIG. 5 explaining the mechanism of microbubbles generation.

FIG. 9 Shows another embodiment as same to the FIG. 3.

FIG. 10 Shows another embodiment as same to the FIG. 3.

FIG. 11 (*a*)~(*d*) describing the attachment procedure of the microbubble generators concerning another embodiment.

EXPLANATION OF LETTERS & NUMBERS

1 ship hull
2 ship's bottom
3 air supply pipe
4 assist compressor
5 pipe from the assist compressor
6 branch pipe
7 ellipse shaped hole
8 retainer plate
10 microbubble generator
11 flange portion
12 gas-liquid mixture space
13 wing
14 wall
15 junction
16 changeover valves
L.W.L. Waterline
R1 upper region
R2 lower region
R3 middle region
g1 space formed ahead of the wing
g2 space formed rearward of the wing
V0-V4 pressure regulators

What is claimed is:

1. A frictional resistance reduction ship, comprising:
   a ship equipped with microbubble generators, said microbubble generators comprising first and second sets of microbubble generators attached to lateral sides of ship hull from ship waterline to ship bottom, each of said microbubble generators being equipped with a wing spaced from the ship hull for generation of negative pressure during navigation of the ship;
   said first set of microbubble generators attached to an upper part of the ship hull in a first region below the ship waterline, said first set of microbubble generators each having a first air-liquid mixture space opposite the wing for mixing seawater and air;

a first air charging line provided for said first set of microbubble generators having a first end and a second end, said first end connected to the first air-liquid mixture space opposite the wing, and said second end of said first air charging line exposed to open atmosphere, said second set of microbubble generators attached to a lower part of the ship hull proximate said hull bottom in a second region below said first set of microbubble generators, said second set of microbubble generators each having a second air-liquid mixture space opposite the wing for mixing seawater and air;

a second air charging line provided for said second set of microbubble generators having a first end and a second end, said first end of the second air charging line connected to the second air-liquid mixture space opposite the wing in said second set of microbubble generators, and said second end of said second air charging line connected to an assist compressor.

2. A frictional resistance reduction ship according to claim 1, wherein said first set of microbubble generators are selectively exposed to the atmosphere or connected with the assist compressor by changeover valves.

3. The frictional resistance reduction ship according to claim 2, wherein pressurized air from said assist compressor is supplied to each of said second set of microbubble generators through branch pipes, each said branch pipes being equipped with pressure regulator so that higher pressure air is supplied to lower ones of said second set of microbubble generators.

4. A method of operating the frictional resistance reduction ship according to claim 2, comprising:

generating air bubbles along the sides of said ship hull to reduce frictional resistance of the hull when the ship is moving through the water, wherein when the navigation speed of said ship is slower than cruising speed, air bubbles are generated only from the microbubble generators connected to the assist compressor, and wherein when said ship is moving at cruising speeds, air bubbles are generated from all of the microbubble generators.

5. The frictional resistance reduction ship according to claim 1, wherein pressurized air from said assist compressor is supplied to each one of said second set of microbubble generators through branch pipes, each said branch pipes being equipped with pressure regulator so that higher pressure air is supplied to lower ones of said second set of microbubble generators.

6. A method of operating the frictional resistance reduction ship according to claim 5, comprising:

generating air bubbles along the sides of said ship hull to reduce frictional resistance of the hull when the ship is moving through the water, wherein when the navigation speed of said ship is slower than cruising speed, air bubbles are generated only from the microbubble generators connected to the assist compressor, and wherein when said ship is moving at cruising speeds, air bubbles are generated from all of the microbubble generators.

7. A method of operating the frictional resistance reduction ship according to claim 1, comprising:

generating air bubbles along the sides of said ship hull to reduce frictional resistance of the hull when the ship is moving through the water, wherein when the navigation speed of said ship is slower than cruising speed, air bubbles are generated only from the microbubble generators connected to the assist compressor, and wherein when said ship is moving at cruising speeds, air bubbles are generated from all of the microbubble generators.

8. A frictional resistance reduction ship, comprising:

a ship equipped with microbubble generators, said microbubble generators comprising first, second and third sets of microbubble generators attached to lateral sides of ship hull from ship waterline to ship bottom, each of said microbubble generators being equipped with a wing spaced from the ship hull for generation of negative pressure during navigation of the ship;

said first set of microbubble generators attached to an upper part of the ship hull in a first region below the ship waterline, said first set of microbubble generators each having a first air-liquid mixture space opposite the wing for mixing seawater and air;

a first air charging line provided for said first set of microbubble generators having a first end and a second end, said first end connected to the first air-liquid mixture space opposite the wing, and said second end of said first air charging line exposed to open atmosphere, said second set of microbubble generators attached to a lower part of the ship hull proximate said hull bottom in a second region below said first set of microbubble generators, said second set of microbubble generators each having a second air-liquid mixture space opposite the wing for mixing seawater and air;

a second air charging line provided for said second set of microbubble generators having a first end and a second end, said first end of the second air charging line connected to the second air-liquid mixture space opposite the wing in said second set of microbubble generators, and said second end of said second air charging line connected to an assist compressor;

said third set of microbubble generators attached to a third region between said first region and said second region, said third set of microbubble generators having a third air-liquid mixture space opposite the wing for mixing seawater and air;

a third air charging line provided for said third set of microbubble generators having a first end and a second end, said first end of said third air charging line connected to the third air-liquid mixture space opposite the wing in said third set of microbubble generators, and said second end of said third air charging line being selectively exposed to the atmosphere or connected with the assist compressor by changeover valves.

9. The frictional resistance reduction ship according to claim 8, wherein pressurized air from said assist compressor is supplied to each of said second and third sets of microbubble generators through branch pipes, each said branch pipes being equipped with pressure regulator so that higher pressure air is supplied to lower ones of said second and third sets of microbubble generators.

10. A method of operating the frictional resistance reduction ship according to claim 8, comprising:

generating air bubbles along the sides of said ship hull to reduce frictional resistance of the hull when the ship is moving through the water, wherein when the navigation speed of said ship is slower than cruising speed, air bubbles are generated only from the microbubble generators connected to the assist compressor, and wherein when said ship is moving at cruising speeds, air bubbles are generated from all of the microbubble generators.

* * * * *